United States Patent [19]

Rasmussen

[11] Patent Number: 5,063,315

[45] Date of Patent: Nov. 5, 1991

[54] ELECTRICAL COIL CONNECTOR FOR DYNAMOELECTRIC MACHINE WINDINGS

[75] Inventor: Paul C. Rasmussen, Schaghticoke, N.Y.

[73] Assignee: General Electric Company, Schenectady, N.Y.

[21] Appl. No.: 292,978

[22] Filed: Jan. 3, 1989

[51] Int. Cl.⁵ .......................... H02K 3/28; H02K 3/00
[52] U.S. Cl. ..................................... 310/71; 310/180; 29/598
[58] Field of Search ................ 310/71, 180, 208, 260, 310/42, 182, 189, 197, 200, 234; 336/107, 192; 174/94 R; 29/596, 598; 439/507–514, 880

[56] References Cited

U.S. PATENT DOCUMENTS

| | | | |
|---|---|---|---|
| 753,278 | 3/1904 | Lindeman | 310/201 |
| 3,292,025 | 12/1966 | Victor | 310/180 |

FOREIGN PATENT DOCUMENTS 1957772 11/1966 Fed. Rep. of Germany .

OTHER PUBLICATIONS

Patent Abstracts of Japan, vol. 6, No. 103 (E-112) (981) Jun 12, 1982, & JP-A-57 036552, Feb. 1982.

*Primary Examiner*—Steven L. Stephan
*Assistant Examiner*—Judson H. Jones
*Attorney, Agent, or Firm*—Nixon & Vanderhye

[57] ABSTRACT

The bottom coil ends of adjacent electrical coils of a dynamoelectric machine are interconnected in electrical series relationship by means of an offset accommodating, multi component connector assembly comprising a pair of end pieces connected to coil ends in a brazed lap joint relationship and a bridging member of predetermined form interconnecting the end pieces.

28 Claims, 2 Drawing Sheets

ELECTRICAL COIL CONNECTOR FOR DYNAMOELECTRIC MACHINE WINDINGS

The Government of the United States of America has certain rights in this invention pursuant to contract No. 3352-766 awarded by the U.S. Department of the Navy.

BACKGROUND OF THE INVENTION

This invention relates to an electrical connector and more particularly to a multi component electrical connector assembly adapted to be connected in a lap joint relationship to coil ends of adjacent electrical coils in a dynamoelectric machine rotor to connect a plurality of coils in electrical series relationship. Reference is made to U.S. Pat. No. 3,292,025—Victor 12/13/66 assigned to the same assignee as the present invention, and incorporated by reference herein.

In a dynamoelectric machine a plurality of rotor windings such as the field winding for a large turbogenerator comprise electrical coils which are wound in a narrow rectangular loop configuration having longer side sections and shorter end sections. The coils may be wound from a continuous electrical conductor to comprise a plurality of superimposed narrow rectangular conductor loops in registry relationship in a stacked array.

A turbogenerator rotor is usually of a cylindrical configuration having narrow axial slots formed in its periphery in spaced circumferential relationship. The narrow rectangular electrical coils as above described are placed in the rotor slots so that each opposite longer side section of the coil loop reside in one of a pair of the predetermined spaced axial slots. In the stacked array of conductor loops or turns, the end of the first conductor at the start of the coil may be at the bottom of the stacked array of conductors and the other end point of the coil is at the top of the stack. In some instances, i.e. with respect to very large dynamoelectric machines the individual coil conductor or strand may comprise one or more rectangular cross section copper strips of a total thickness approaching 0.75 inch and a width of about 1.75 inches. The stack height of a plural loop coil as described may be about 6.0 inches and accordingly the coil groove depth exceeds this dimension by an amount sufficient to accommodate electrical insulation between the conductor strands, and insulation and coil wedges at the top of the slot.

In the usual practice of winding coils for dynamoelectric machines the coils are wound in what is referred to as right hand or left hand winding so that in the stacked array of a pair of adjacent right and left hand coils, the starting point of one coil is at the same elevation as the end point of the oppositely wound adjacent coil. Also, the coils or loops are wound so that the distance between the longer sides of the narrow rectangular loop is generally equal to the distance on the circumference of the rotor between the axial slots into which the longer sides are positioned. The beginning and end of a coil are found in the shorter end sections of the narrow rectangular coil and those shorter end sections including a beginning or end point are referred to as half straps. The coils for the rotor are dimensioned so that, in their assembled relationship in the slots in the rotor, the first coil in the series for example lies within the second coil i.e., the first coil is a smaller and narrower rectangular coil lying generally concentrically within a larger second coil i.e. the rectangular configuration of the second coil is longer and wider than those counterpart dimensions of the first coil, and the longer sides of the second coil fit in a pair of more widely spaced slots in the rotor than those of the first coil. In this relationship the shorter end sections of each coil lie adjacent to each other with a half strap of each coil also lying closely adjacent to each other, and because of the opposite winding of the coils, one of the adjacent half straps represents the end of one coil while the adjacent half strap represents the beginning point of another and adjacent coil.

As described, in a series of coils, the second as well as the subsequent coils to be assembled to the rotor, are larger than the preceding coil and surround preceding coils in coaxial relationship so that the longer side sections of the subsequent coils fit in axial slots which are peripherally spaced from the preceding coil sides. A large number of coils on the rotor results in a significantly great number of end section conductors at the ends of the rotor leading to what is referred to as a very congested space at the rotor ends between the slots. Furthermore, as noted herein and in the Victor patent, adjacent coils of a series of coaxial coils are oppositely wound so that, in one slot, the coil may be described as wound from the bottom to the top of the slot and the subsequent coil is wound from the top to the bottom of the slot with the result that the end of the last conductor of one coil is at the same radial height from the axial center line of the rotor as the beginning end of an adjacent coil. Ordinarily, all coils in the rotor are to be electrically connected in electrical series relationship and an electrical bridging connector or member is utilized at the periphery or top of a pair of coils to connect the ends of two adjacent half straps which are generally at the same radial height. A further connector is utilized at the bottom of the stacked array of a pair of adjacent coils to connect adjacent half strap ends. This procedure is continued for the series of coils so that the end of one coil is connected to the beginning of an adjacent coil for electrical series connection of all coils in the series. As further described in the Victor patent, because of the large number of coil turns, and the large cross-sectional dimensions of the conductors, there is limited space at the rotor ends for electrical bridging connectors. When the coil ends to be connected are at the top of the stacked array of conductors in a pair of adjacent coils an electrical bridging connector may comprise a simple strip conductor brazed to the coil ends. However, at the bottom of the stacked array, due to various electrical and mechanical design problems, the coil ends may not lie in the same plane and therefore be radially offset from each other. Accordingly, a coil connector at the bottom of adjacent coils comprises a more complex configuration with attendant higher production costs.

OBJECTS OF THE INVENTION

It is an object of this invention to provide an improved electrical connector for the bottom ends of rotor coils in a dynamoelectric machine.

It is another object of this invention to provide an improved and multi component electrical connector for insertion between offset bottom conductors of electric coils of dynamoelectric machines.

It is yet another object of this invention to provide an improved multi component electrical connector for the coils in the rotor winding of dynamoelectric machine which is resistant to electrical joint separation from bending forces thereon.

SUMMARY OF THE INVENTION

A pair of oppositely facing axially spaced apart and radially offset conductor ends of a pair of adjacent electrical coils in a dynamoelectric machine are electrically connected together by means of a multi component electrical connector without a change in the relative positions of the conductor ends with respect to each other. A pair of lap joint end pieces are braze joined one to each conductor end in a brazed lap joint connection. A bridge member is employed to bridge the spaced and offset relationship of the coil ends and be braze joined to the end pieces with flat abutting surfaces.

This invention will be better understood when taken in connection with the following description and drawings.

DESCRIPTION OF A PREFERRED EMBODIMENT OF THE INVENTION

Figure 1:
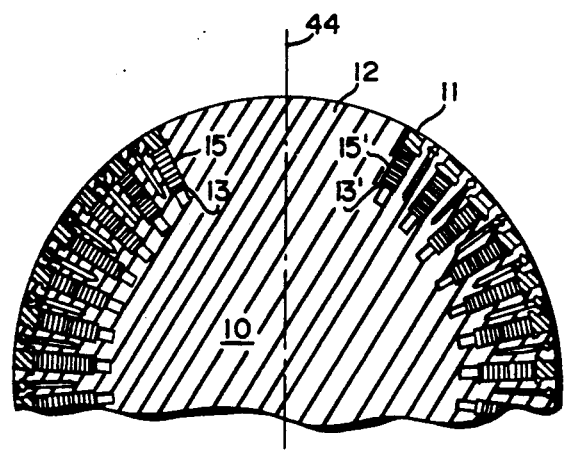
FIG. 1 is a cross-sectional view of a turbogenerator rotor illustrating rotor slots and field winding coils therein.

Referring to FIG. 1 a dynamoelectric machine rotor 10 includes a peripheral row of axial slots 11 which project radially into the periphery of the rotor and are equidistantly circumferentially spaced apart. The electrical poles of a rotor whether a two or four pole rotor, are diametrically opposed rotor sections such as section 12 which do not have slots therein and are adapted to be surrounded by an electrical coil inserted in opposite slots 13 and 13', for example, which are next adjacent pole piece 12. A cross-sectional illustration of one longer side of a narrow rectangular coil inserted in a rotor slot is shown in FIG. 2.

Figure 2:
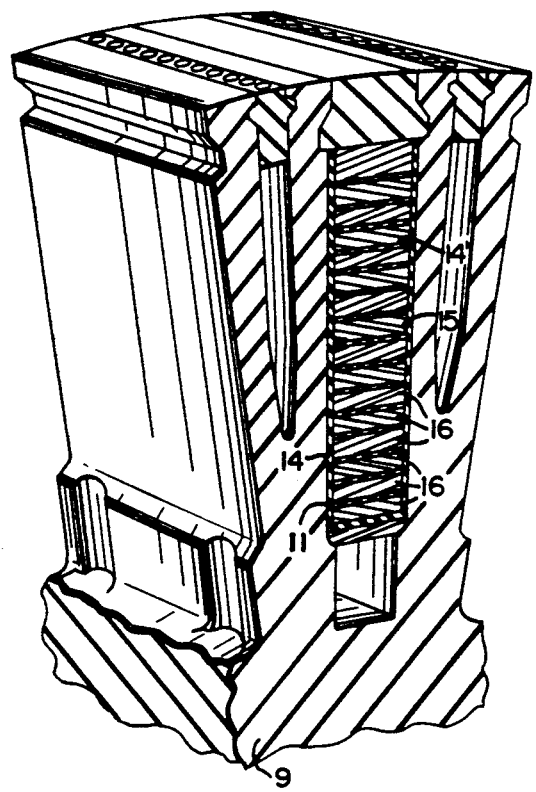
FIG. 2 is an enlarged cross-sectional illustration of a section of a rotor together with a slot and field coil conductors therein.

Referring now to FIG. 2 a rotor slot 11 of a rotor slot section 9 includes a layer of electrical insulation 14 along its sidewalls and bottom wall. One longer side 15 of a narrow rectangular coil is shown within slot 11 as a stacked array of rectangular cross-section conductors or turns 16 which are usually copper strips or bars suitably insulated frome each other by electrical insulation 14'. A long narrow rectangular coil will have a pair of opposite longer sides and a pair of opposed shorter ends interconnecting the sides to form the rectangular configuration. The copper strips or bars may be a continuous length of copper from which a long narrow rectangular coil is wound. Alternatively the coil may be manufactured in sections which are suitably joined together to provide a continuous electrical coil. Also, each turn or conductor 16 may comprise a plurality of smaller cross-section strips combined to comprise a conductor or coil turn 16.

Figure 3:
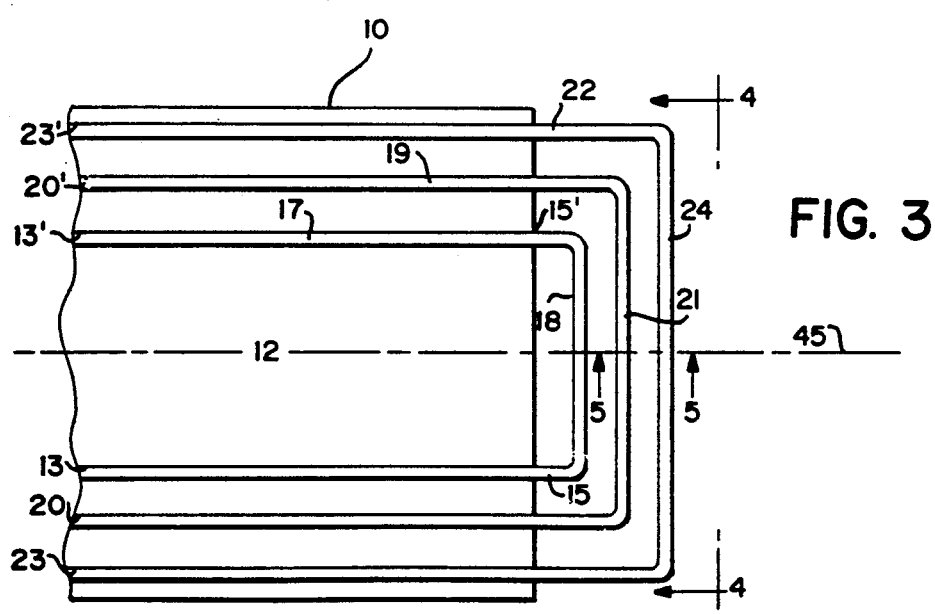
FIG. 3 is a schematic illustration of a top view of a rotor illustrating the surrounding relationship of a plurality of field winding coils thereon.

Referring now to FIG. 3, each longer side 15 and 15' of a full single rectangular coil 17 resides in one of a pair of spaced slots 13 and 13' one on each side of pole piece 12 so that coil 17 closely surrounds pole piece 12. One shorter end 18 of rectangular coil 17 lies closely adjacent to one end of rotor 10 to interconnect the conductor turns 16 (FIG. 2) of the longer coil sides 15 and 15' for a continuous coil. Coil 17 which fits in slots 13 and 13' is referred to as a first coil and closely surrounds pole piece 12. The next or second coil 19 has its longer sides residing in the next set of slots 20 and 20' with an end section 21 interconnecting the longer sides. Third coil 22 resides in slots 23 and 23' and includes an end section 24. Third coil 22 surrounds both the first and second coils 17 and 19 in concentric relationship as well as pole piece 12. Additional coils in the series of coils, as many as nine, are positioned in further spaced slots and surround the preceding coils. As previously described, the coils are wound or formed so that the beginning and end of each coil are located in the end sections, and that part of an end section containing a coil end is referred to as a half strap.

The stacked turn structure of FIG. 2 is repeated in each slot of FIG. 1 and a plurality of coils are successively placed in the row of slots 11 of a rotor 10. Also, as previously described, the coils of each pair are oppositely wound, sometimes described as the first coil being wound from the bottom to the top of its slot and the second coil being wound from the top of its slot to the bottom thereof. Using the FIGS. 2 and 3 illustrations as an example, one end of second coil 19 will be in the end section 21 of the uppermost conductor. In the next coil (22) in surrounding relationship, which is oppositely wound, the first turn with its end will be at the bottom of its slot and its other end at the top of its slot.

With the described relationship incorporated in FIGS. 1 and 3, the end of the first coil and the beginning of the second coil will be at the top of their slots or in the upper conductor of their end sections 18 and 21 of FIG. 3. These ends will be laterally spaced apart as are sections 18 and 21 of FIG. 3 but will also be essentially in the same plane greatly facilitating their electrical connection to each other by a bridging member or electrical connector which, for example, may be a short straight section of a copper strip braze joined directly to the coil ends or first to a connector such as that of the noted U.S. Pat. No. 3,292,025—Victor, and then the connector is joined to the coil ends to connect the straight coils in electrical series relationship, i.e. the end of one coil to the beginning of the next coil. This practice is continued for all other coils on a pole piece about the periphery of the rotor so that the end of each coil is connected to the beginning of an adjacent coil and all coils are connected in electrical series relationship. A connector connecting the ends of the coils at the top of the slots or coils is referred to as a top to top connector which is applicable for the first and second coils of FIG. 3. However, because of the oppositely wound relationship the series connection for the next adjacent pair of coils, second and third coils 2 is at the bottom, third and fourth coils at the top, fourth and fifth coils at the bottom, etc. so that top to top connectors alternate with bottom to bottom connectors. In the case of an oppositely wound coil from the top to the bottom of a slot, the coil ends may not be in the same plane as they are at the top of the slot. Various factors contribute to offset relationship of coil ends at the bottom of the slots. In some instances the number of coil turns may be different and, although the starting point may be predetermined at the top of the slot, the depth of the last turn in the slot may be different between coils. In other instances, electrical design considerations result in some succeeding slots being of greater depth as shown in FIG. 1, exaggerated for the purpose of clarity, where a number of slots next adjacent pole piece 12 penetrate successively deeper into rotor 10 so that their bottom ends are in radially offset relationship. Therefore, bottom to bottom connectors are more complex since they must accommodate radial offset as well as lateral (or axial with respect to the rotor axis) spacing between rigid half strap conductors. This offset relationship is best illustrated in FIG. 4 which is a view of the end sections of FIG. 3 taken along line 4—4 thereof and of only the half strip end sections of adjacent concentric coils.

Figure 4:
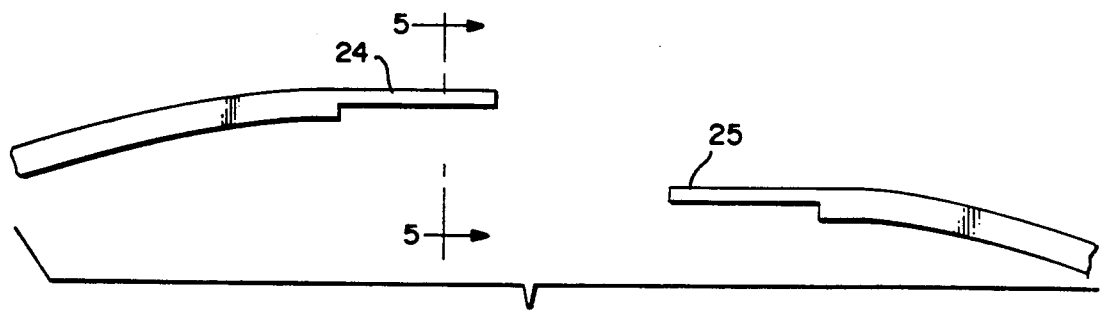
FIG. 4 is a view of FIG. 3 taken along the line 4—4 thereof to show radial offset relationship of coil half strap ends to be joined.

In FIG. 4 coil half strap end 24 of one coil, coil 19 for example, is opposite to but radially offset from coil half strap end 25 of coil 22, for example, which is an adjacently oppositely wound coil. In addition, ends 24 and 25 are laterally (or axially along the rotor axis) spaced from each other since the end sections of the second and third coils 19 and 22 are laterally (axially) spaced from each other as shown in FIG. 3. This arrangement is best illustrated in FIG. 5 which is a cross-sectional and end view of FIG. 4 taken along line 5—5 thereof, and with all turns of coils 19 and 22 removed except for those turns having half straps and conductor ends thereon.

Figure 5:
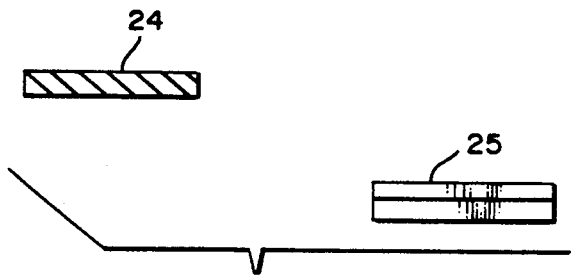
FIG. 5 is a view of FIG. 3 taken along the line 5—5 thereof to show horizontal or lateral spacing of coil half strap ends to be joined.

Referring now to FIG. 5 a half strap of one coil 19 terminates with coil end 24, and a half strap of an adjacent coil 22 terminates with a coil end 25. Coil ends 24 and 25 are not in coaxial relationship with each other and are both laterally spaced apart and radially offset with respect to each other. Also, coil ends 24 and 25 show cutout sections at the ends thereof for a lap joint connection. The coils of a dynamoelectric machine may be broadly defined as a plurality of turns or loops positioned in coaxial and coincident relationship with the turns in a stacked array as shown in FIG. 2. The coils are formed and positioned on a rotor pole piece so that in a pair of a larger and a smaller diameter coil positioned on a pole, the coils of the pair are in concentric and spaced apart relationship with a half strap end of each coil generally facing each other (a) in radially offset relationship along their axes (FIG. 4) and in lateral spaced apart relationship (FIG. 5). The end sections or half straps are both radially offset and laterally spaced apart and parallel to each other. Both positions are included in the expression "axial (laterally FIG. 3) spaced apart and radial offset relationship to each other."

As shown in FIGS. 4 and 5, coil ends 24 and 25 need to be bridged by a connector which will accommodate the lateral spacing of ends 24 and 25 as well as the radial offset spacing. Also, because of the inherent rigidity of the coil conductors as well as the operational electrical and mechanical stresses imposed thereon, the electical connections between the connector and coil ends are high strength and low stress connections. Preferably the connections are molten metal joints between abutting, large area, flat surfaces. Brazed joints for all connections have been found to provide good results in the practices of this invention.

The connector assembly of this invention may be most advantageously utilized as an improved bottom to bottom coil connector which accommodates lateral spaced and radially offset conductor ends 24 and 25 of FIGS. 4 and 5. The bottom to bottom coil connector assembly of this invention is a multi component connector adapted to bridge the spaced nature of coil ends and comprises a bridge or step bridge member of a predetermined shape, depending on the position of the coil ends, and a pair of connector end pieces.

The step member is utilized to electrically interconnect laterally spaced and radially offset coil ends without the necessity of significantly changing their predetermined positions, and to do so with a series of flat abutting surfaces oriented and positioned for effective brazing. Such a bridging member is shown in FIG. 6.

Figure 6:
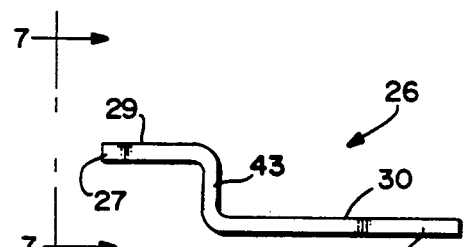
FIG. 6 is an elevational and edge view of a bridge member in the form of a step bridge for offset coil ends.

Referring now to FIG. 6, a bridging member in the form of a step bridge 26 comprises a rigid rectangular copper strip of rectangular cross-section having an angular discontinuity between its opposed ends by being formed with a section of each of its ends bent or otherwise oriented to project oppositely at a 90 degree angular relationship to provide a step configuration with projecting planar and parallel tab sections 27 and 28 together with flat surfaces 29 and 30 respectively thereon.

Figure 7:
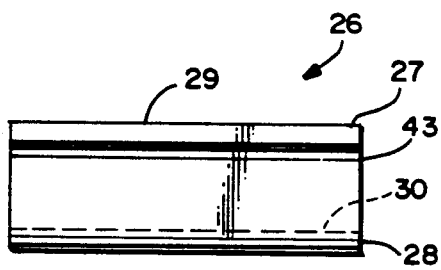
FIG. 7 is an elevation and side view of the step bridge member of FIG. 6 of this invention taken along line 7—7 thereof.

FIG. 7 is a frontal view of a step member 26 of FIG. 6 taken along line 7—7 thereof illustrating a preferred width of about 2.0 inches for surfaces 29 and 30 of FIG. 6. As illustrated in FIG. 4, coil end 24 faces in the opposite direction to that of coil end 25 in a radial offset relationship. Step bridge member 26 of this invention is joined to opposed conductor ends such as ends 24 and 25 (FIGS. 4 and 5) by means of a special connector end piece 31 as shown in FIG. 8.

Figure 8:
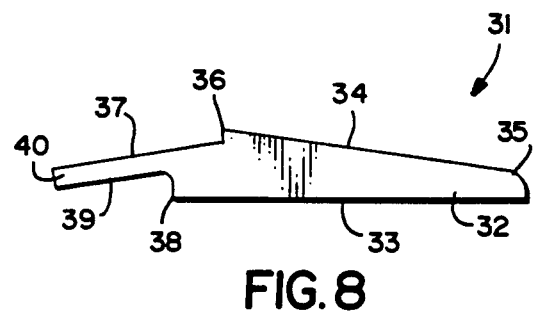
FIG. 8 is a side elevational view of a connector end piece component of this invention.

Referring now to FIG. 8, connector end piece 31 in cross section comprises a main, generally wedge-shaped body 32 with a flat horizontal lower or bottom surface 33 whose length is approximately equal to the width of surfaces 29 and 30 of FIGS. 6 and 7. The upper surface 34 of wedge body 32 is a sloping or tapered surface tapering from a thicker edge of body 32 to a relatively narrow edge surface 35.

The thicker part of the wedge body 32 contains a cutaway section in the top surface as defined by a sharp angled shoulder 36 and an intersecting shelf surface 37 of the cutaway section. At the bottom surface 33, and generally opposite the shoulder 36 in the top surface 34, a further cutaway section is defined by a radius shoulder 38 and a lower intersecting shelf surface 39. The two shelf surfaces 37 and 39 are parallel to each other in spaced apart relationship to define a projecting lip or ledge member 40. Ledge member 40 projects from the thicker end of the generally wedge-shaped connector end piece body 32 in a slightly slanted direction towards the plane of the bottom surface 33 with a projection distance of about 0.875 inch from shoulder 36.

In one practice of this invention, bottom surface 33 of connector end piece 31 is about 2.0 inches in width, and tabs 27 and 28 of step member 26 are also about 2.0 inches in width. Tab surfaces 29 and 30 and end piece surface 33 are smooth flat surfaces, and an end piece 31 and a step bridge member 26 are brought together with mating surfaces in registry abutting relationship to be braze joined, i.e. end piece 31 of FIG. 8 fits on tab 27 of FIG. 7 so that end piece surface 33 (FIG. 8) fits coextensively and in registry with surface 29 (FIG. 7). Also these surfaces 29, 30 and 33 are each about 2.0 inches in length. It is an advantage of this invention that the width of mating parts such as the coil ends 24 and 25 and the end pieces 31 are equal to each other, and in spite of the offset relationship to be overcome, are all large area braze surfaces.

A connector end piece 31 is braze joined to each tab section 27 and 28 of step member 26 of FIG. 6 so that the projecting ledges 40 are oppositely directed transversely to the step member axis, and one ledge may be braze joined to one coil half strap facing in one direction, and the other connector ledge can be braze joined to the other adjacent coil half strap facing in the opposite direction. The assembled relationship as described is best shown in perspective in FIG. 9

Figure 9:
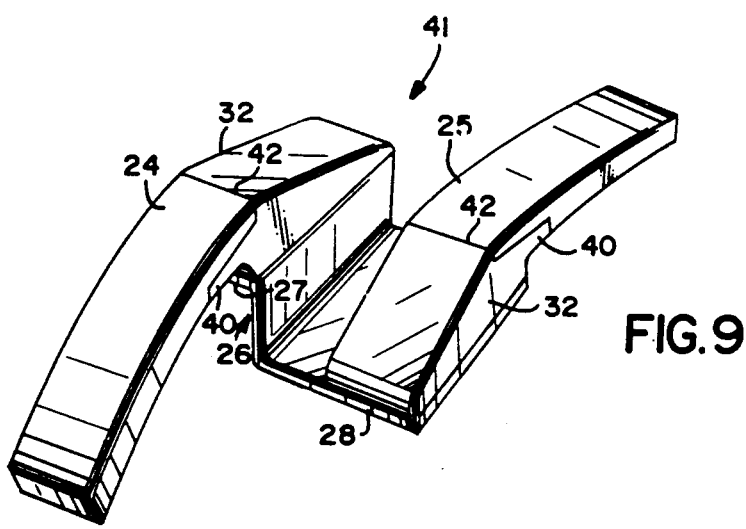
FIG. 9 is a perspective view of the multi component connector of this invention interconnecting a pair of laterally spaced and radially offset half straps.

Referring now to FIG. 9 the connector assembly 41 comprises a step member 26 of FIG. 6 oriented between adjacent coil ends 24 and 25 of FIG. 4 to which a pair of oppositely directed end pieces 31 are braze joined to tab members 27 and 28 of FIG. 6 so that their oppositely facing ledges 40 are in alignment with and underlie coil ends 24 and 25 of FIG. 4. Each coil end 24 and 25 of FIG. 4 is formed with a cutout section corresponding to the ledge cutout sections 36 of end pieces 31 so that a smooth fitting lap joint is defined by the two mating cutout sections. The lap joint is suitably brazed as a final joint.

As illustrated in FIGS. 5 and 9, the half strap ends of a coil are not precisely horizontal but may have a slight curve or slant in conformance to the curve geometry of coil end windings. Accordingly the final braze lap joint is not precisely horizontal, and because of the defined taper of the ledges 40 of end pieces 31 some of the slant or curvature of the half straps is accommodated. Furthermore, rotational forces of the rotor tend to impose bending forces on the lap joint of the connector end pieces tending to cause some cracking in the upper joining surfaces 42 of the lap joints. The taper of the ledges tends to somewhat minimize these cracking or bending stresses.

The components of the connector assembly of this invention represent a decrease in complexity and machining processes as compared to a single piece connector machined from a single copper piece to provide a proper offset together with angles and tapers for proper positioning on surfaces to be brazed. Since most connecting related dimensions are predetermined for a certain model or design of a dynamoelectric machine, the components of this invention may be pre-manufactured in significant numbers to further reduce production costs. Moreover, the foregoing reasons also serve as a basis for partial or full prior assembly of the connector components of this invention separately as well as together with a coil end.

Production simplification of the connector assembly is also evidenced by the feature that the length (FIG. 8) of the bottom surfaces 33 of end pieces 31 is equivalent to the length of the projecting tab sections 27 and 28 of step member 26 (FIG. 9). All rotor coils are manufactured with very close tolerances and their assembly to a rotor 10 is accomplished with a high degree of accuracy. Accordingly, the offset dimensions of the coil ends are predetermined and not readily amenable to significant change after coil assembly on a rotor. Accordingly the bottom to bottom connector assembly of this invention provides an electrical connector which accurately connects offset coil ends without the necessity of changing or otherwise altering the relatively fixed position of the coil ends as illustrated in FIGS. 4 and 5. At the same time the four brazed joints each provide a small amount of alignment variance to more precisely fit or accommodate small variances in the offset and axially spaced apart relationship of coil ends. The coil ends to be connected by the connector assembly of this invention are also angularly or diagonally offset from each other, as illustrated in FIG. 5, from a vertical centerline passing therebetween. The step member of this invention bridges the angular distance between coil ends without any need to include any angular position. The offset bridging is achieved by a desirable relationship of having the central section 43 of step member 26 ascending vertically between the coils and utilizing projecting tab sections therefrom to obviate any angular orientation of step member 26. In all instances of the use of a connector assembly of this invention, the shape of the bridging member or step bridge member of this invention is variable and determined by the position of the half strap ends and their spaced apart dimensions. Accordingly, the bridging member of FIGS. 6 and 7 may range from a flat strip where the coil ends are in the same plane to various step configurations where the length of the center section 43 (FIG. 6) as well as the projecting distances of tabs 27 and 28 vary commensurately with the offset dimensions of the coil end. It is preferable that any bridging member have large flat planar opposed end surfaces such as tab surfaces 29 and 30 which the bridge member supports adjacent the coil ends or adjacent the flat planar surfaces 33 of the end pieces. The step configuration is broadly described as an angular discontinuity between opposite flat planar end surfaces of an original straight strip, e.g. in FIG. 6, section 43 represents an angular discontinuity between surfaces 29 and 30 or tabs 27 and 28. The angular disco is determined by the geometry of the coil ends and the bridging member traverses or bridges the distance between the coil ends to provide a flat planar surface parallel to and in contact with a mating flat planar surface of each connector end piece.

The connector end pieces are generally described as elongated wedge-shaped members as illustrated in FIG. 8, and when joined to step bridge member 26 of FIGS. 6 and 7 they project in opposite directions transversely with respect to the bridging member, e.g. along an axis which bisects the width of a step or tab. This arrangement is illustrated in FIG. 9 which is also illustrative of a preassembled connector of this invention where end pieces 31 are joined to a bridge member such as step bridge 26 or a straight flat strip bridge member prior to any joining of the end pieces to a coil end. The connector assembly of this invention as illustrated in FIG. 9 is preferably positioned at the centerline of the pole, e.g. at centerline 44 of FIG. 1, for example, or centerline 45 of FIG. 3.

While this invention has been disclosed and described with respect to a preferred embodiment thereof, it will be apparent to those skilled in the art that various changes and modifications may be made thereto without departing from the spirit and scope of the invention as incorporated in the following claims.

What is claimed:

1. An electrical connector for laterally spaced apart opposite ends of a pair of adjacent electrical coils of a dynamoelectric machine comprising in combination
   a) a pair of connector end pieces each of which is adapted for connection to a respective one of said coil ends, and
   b) a bridging member adapted to multiplanar bridge the said laterally spaced coil ends for connection to said connector end pieces.

2. An electrical connector for laterally spaced apart opposite ends of a pair of adjacent electrical coils of a dynamoelectric machine comprising in combination:
   a) a pair of connector end pieces each of which is adapted for connection to a respective one of said coil ends, said connector end pieces each including a flat planar surface thereon and
   b) a multiplanar bridging member adapted to bridge the said laterally spaced coil ends for connection to said connector end pieces said bridging member including a pair of flat planar surfaces disposed at opposite ends thereof which engage the said flat planar surfaces of said pair of connector end pieces.

3. An electrical connector for laterally spaced apart opposite ends of a pair of adjacent electrical coils of a dynamoelectric machine comprising in combination:
   a) a pair of connector end pieces each of which is adapted for connection to a respective one of said coil ends, and
   b) a multiplanar bridging member adapted to bridge the said laterally spaced coil ends for connection to said connector end pieces, said bridging member including an angular discontinuity between said connector end pieces.

4. The invention as recited in claim 1 wherein each said connector end piece and each said coil end have an edge surface having a modified shape for connection and joining of a connector end piece to a coil end.

5. An electrical connector for laterally spaced apart opposite ends of a pair of adjacent electrical coils of a dynamoelectric machine comprising in combination
   (a) a pair of connector end pieces each of which is adapted for connection to a respective one of said coil ends, each said connector end piece and each said coil end have an edge surface having a modified shape for connection and joining of a connector end piece to a coil end,
   (b) a bridging member adapted to bridge the said laterally spaced coil ends for connection to said connector end pieces, and
   said modified edge surface comprises a part of a lap joint cutaway section to define a full lap joint when a connector end piece is connected to its respective coil end.

6. An electrical connector for laterally spaced apart opposite coil ends of a pair of adjacent coils of a dynamoelectric machine comprising in combination
   a) a bridging member adapted to bridge the lateral spaced apart distance of said coil ends to provide opposite flat planar surface ends thereof adjacent said opposite coil ends,
   b) a pair of elongated wedge-shaped end pieces each having a slanted projecting ledge thereon and adapted to be connected one to each end of said flat planar surface ends of said bridging member so that each said ledge engages a coil end in axial opposed and underlying relationship.

7. The invention as recited in claim 6 wherein said elongated end pieces are connected to said bridging member in oppositely directed relationship transversely to said bridging member.

8. A preassembled multipart electrical connector for laterally spaced apart opposite coil ends of a pair of adjacent coils of a dynamoelectric machine comprising, incombination,
   a) a bridging member having opposite flat planar surfaces at opposite ends thereof and adapted to bridge the laterally spaced apart coil ends to provide an end surface thereof adjacent each coil end,
   b) an elongated wedge-shaped end piece having a large flat surface thereon joined to each end surface of said bridging member so that the two end pieces project in opposite directions transversely to said bridging member.

9. The invention as recited in claim 8 wherein said bridge member includes an angular discontinuity therein between said elongated end pieces.

10. A connector assembly adapted to connect a pair of coil ends of adjacent electrical coils in a dynamoelectric machine where the said coil ends are in axial spaced apart opposing and offset relationship comprising in combination
    (a) a pair of connector end pieces each connected to a separate one of said coil ends,
    (b) each said end piece having a flat bottom surface which is adapted to be parallel to each other when the end pieces are connected to the said offset coil ends.
    (c) a bridge member interconnecting said end pieces in their axially spaced offset relationship,
        (1) said bridge member having spaced apart oppositely projecting planar tab sections thereon,
        (2) said planar tab sections engaging said flat bottom surfaces of said end pieces in planar abutting relationship and metal joined thereto to provide an electrical connection between said coil ends.

11. The invention as recited in claim 10 wherein said bridge member comprises a narrow rectangular metal strip having opposite and sections formed at a 90 degree angle to the plane of the strip to provide the said oppositely projecting planar tab sections.

12. The invention as recited in claim 10 wherein each said end piece and said coil ends include a lap joint cutaway for joining said end pieces to said coil ends in brazed lap joint configurations.

13. The invention as recited in claim 10 wherein each said end piece comprise a generally wedge-shaped body having a flat rectangular bottom surface and an upper surface which slopes from a thicker edge of said body adjacent one side of said rectangular surface in a direction towards the plane of said rectangular surface to define a thinner edge coincident with an opposite side of said rectangular surface, said sloping surface having a lap joint cutaway therein for joining to one of said coil ends.

14. The invention as recited in claim 13 wherein said lap joint cutaway is in said sloping surface and adjacent said thicker edge.

15. The invention as recited in claim 14 wherein said wedge-shaped body includes a radius cutaway section in said bottom surface adjacent said thicker edge and opposite to said lap joint cutaway to define a ledge section projecting from said body.

16. The invention as recited in claim 15 wherein said projecting ledge section tapers in a direction towards the plane of said rectangular surface.

17. The invention as recited in claim 15 wherein said ledge section projects from said body about 0.875 inch.

18. The invention as recited in claim 17 wherein the width of said coil ends, said ledge section, and said end pieces are generally equal to each other.

19. The invention as recited in claim 18 wherein the length of said rectangular surface of said body member and the width of said tab sections of said step member are equal.

20. The invention as recited in claim 18 wherein said ledge sections underlie said coil ends in lap joint relationship.

21. An electrical connector for serially connecting together opposingly directed conductor ends of adjacent electrical coils in a dynamoelectric machine having cylindrical geometry about a predetermined axis where said conductor ends may be offset with respect to one another both radially and axially with respect to said axis, said connector comprising:
- a pair of connector end pieces, each said connector end piece including
  - (a) a first flat bonding surface for bonding to a mating surface of one of said conductor ends, and
  - (b) a second flat bonding surface; and
- a bridge member having first and second flat bonding surfaces for respectively bonding to said second flat bonding surfaces of said pair of connector end pieces.

22. An electrical connector as in claim 21 wherein said bridge member includes a radial offset between its first and second flat bonding surfaces when assembled and bonded to said end pieces which are, in turn, bonded to said conductor ends in said dynamoelectric machine.

23. An electrical connector as in claim 21 wherein said bridge member includes an axial offset between its first and second flat bonding surfaces when assembled and bonded to said end pieces which are, in turn, bonded to said conductor ends in said dynamoelectric machine.

24. An electrical connector as in claim 21 wherein said bridge member includes both an axial offset and a radial offset between its first and second flat bonding surfaces when assembled and bonded to said end pieces which are, in turn, bonded to said conductor ends in said dynamoelectric machine.

25. A method for serially connecting together opposingly directed conductor ends of adjacent electrical coils in a dynamoelectric machine having cylindrical geometry about a predetermined axis where said conductor ends may be offset with respect to one another both radially and axially with respect to said axis, said method comprising the following steps, in any order:
- bonding one of said conductor ends to a first flat bonding surface of a connector end piece which also has a second flat bonding surface;
- bonding the other of said conductor ends to a first flat bonding surface of a separate further connector end piece which also has a second flat bonding surface; and
- bonding first and second flat bonding surfaces of a separate bridge member respectively to said second flat bonding surfaces of said connector end pieces.

26. A method as in claim 25 wherein said bridge member includes a radial offset between its first and second flat bonding surfaces when assembled and bonded to said end pieces which are, in turn, bonded to said conductor ends in said dynamoelectric machine.

27. A method as in claim 25 wherein said bridge member includes an axial offset between its first and second flat bonding surfaces when assembled and bonded to said end pieces which are, in turn, bonded to said conductor ends in said dynamoelectric machine.

28. A method as in claim 25 wherein said bridge member includes both an axial offset and a radial offset between its first and second flat bonding surfaces when assembled and bonded to said end pieces which are, in turn, bonded to said conductor ends in said dynamoelectric machine.

* * * * *